(12) United States Patent
Cambou (10) Patent No.: US 11,736,460 B2
(45) Date of Patent: Aug. 22, 2023

(54) ENCRYPTION SCHEMES WITH ADDRESSABLE ELEMENTS

(71) Applicant: Arizona Board of Regents on Behalf of Northern Arizona University, Flagstaff, AZ (US)

(72) Inventor: Bertrand Francis Cambou, Flagstaff, AZ (US)

(73) Assignee: ARIZONA BOARD OF REGENTS ON BEHALF OF NORTHERN ARIZONA UNIVERSITY, Flagstaff, AZ (US)

(*) Notice: Subject to any disclaimer, the term of this patent is extended or adjusted under 35 U.S.C. 154(b) by 0 days.

(21) Appl. No.: 17/499,583

(22) Filed: Oct. 12, 2021

(65) Prior Publication Data

US 2022/0045996 A1    Feb. 10, 2022

Related U.S. Application Data

(62) Division of application No. 16/492,572, filed as application No. PCT/US2018/025500 on Mar. 30, 2018, now Pat. No. 11,533,300.

(60) Provisional application No. 62/479,122, filed on Mar. 30, 2017.

(51) Int. Cl.
| | |
|---|---|
| *H04L 9/40* | (2022.01) |
| *G06F 21/60* | (2013.01) |
| *H04L 9/06* | (2006.01) |
| *H04L 9/08* | (2006.01) |
| *H04L 9/32* | (2006.01) |

(52) U.S. Cl.
CPC ........ *H04L 63/0457* (2013.01); *G06F 21/602* (2013.01); *H04L 9/065* (2013.01); *H04L 9/0825* (2013.01); *H04L 9/3278* (2013.01)

(58) Field of Classification Search
CPC ... H04L 63/0457; H04L 9/065; H04L 9/0825; H04L 9/3278; H04L 9/0866; G06F 21/602

See application file for complete search history.

(56) References Cited

U.S. PATENT DOCUMENTS

| | | |
|---|---|---|
| 8,386,990 B1 | 2/2013 | Truberger et al. |
| 8,667,265 B1 | 3/2014 | Hamlet et al. |
| 2012/0131340 A1 | 5/2012 | Teuwen et al. |
| 2013/0156183 A1* | 6/2013 | Komano ............... H04L 9/0861 380/44 |
| 2013/0254636 A1 | 9/2013 | Kirkpatrick et al. |
| 2013/0276059 A1 | 10/2013 | Lewis et al. |
| 2015/0195088 A1 | 7/2015 | Rostami et al. |
| 2017/0017808 A1* | 1/2017 | Kwong ................. H04L 9/3278 |
| 2017/0279606 A1* | 9/2017 | Kara-Ivanov ........... G06F 21/73 |
| 2018/0145838 A1* | 5/2018 | Wang ..................... H04L 9/3278 |
| 2018/0152306 A1 | 5/2018 | Lu |

* cited by examiner

*Primary Examiner* — Philip J Chea
*Assistant Examiner* — Sangseok Park
(74) *Attorney, Agent, or Firm* — Quarles & Brady LLP (57) ABSTRACT

The present disclosure relates to implementations of physically unclonable functions (PUFs) for cryptographic and authentication purposes. Specifically, the disclosure describes implementations of systems using PUFs that may replace existing public key infrastructures (PKIs).

16 Claims, 8 Drawing Sheets

ENCRYPTION SCHEMES WITH ADDRESSABLE ELEMENTS

CROSS-REFERENCE TO RELATED APPLICATIONS

This application is a divisional patent application of U.S. patent application Ser. No. 16/492,572 entitled "ENCRYPTION SCHEMES WITH ADDRESSABLE ELEMENTS" and filed on Sep. 9, 2019, which is a U.S. National Stage of PCT Application No. PCT/US18/25500 entitled "ENCRYPTION SCHEMES WITH ADDRESSABLE ELEMENTS" and filed on Mar. 30, 2018, which claims priority to U.S. Provisional Patent Application No. 62/479,122 entitled "ENCRYPTION SCHEMES WITH ADDRESSABLE ELEMENTS" and filed on Mar. 30, 2017, the disclosure of which is incorporated herein by reference.

FIELD OF THE INVENTION

The present disclosure relates to implementations of physically unclonable functions (PUFs) for cryptographic and authentication purposes. Specifically, the disclosure describes implementations of systems using PUFs that may replace existing public key infrastructures (PKIs).

BRIEF DESCRIPTION OF THE DRAWINGS

The present disclosure is illustrated by way of examples, embodiments and the like and is not limited by the accompanying figures, in which like reference numbers indicate similar elements. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, where.

DETAILED DESCRIPTION OF PREFERRED EMBODIMENTS

An objective of the present encryption scheme is to complement, or replace, existing Public Key Infrastructures (PKIs). Unlike existing PKIs, the present scheme may not require distributed users to store private keys and may instead rely on addressable elements such as physically unclonable functions (PUFs). Unlike current PKIs that are based on algorithms such as RSA and Elliptic Curve Cryptography (ECC), the present encryption schemes are not based on mathematical equations to generate public/private key pairs which are potentially vulnerable to attack by advanced computing technologies.

Using the present scheme, in a first step, referred to herein as the personalization step, a lookup table is downloaded by a secure server computer of the network. Each lookup table downloaded by the server computer is associated with a specific client or user device. Specifically, each user device that may communicate with the server computer generates its own unique lookup table using an array of addressable elements such as addressable PUF generator (APG) that is part of the circuitry embedded in the user device. The lookup tables, once generated by the user device, are then provided to the server computer. Each lookup table includes a listing of PUF challenges in combination with the address of each PUF of the APG that generated each PUF challenge in the lookup table. In some cases, additional instructions may be provided to the server computer in combination with the lookup table that provide information describing how the data in the lookup table should be accessed and read.

These lookup tables (containing the addresses and instructions on how to generate the challenge-response pairs (CRP)) can act as the "public keys" of the present secure communication scheme. The resulting challenges or responses can act as the secure "private keys".

Using the present scheme, to encrypt a message for a particular user device, e.g., User A, the secure server computer can use any symmetrical encryption method, such as Advanced Encryption Standard (AES)-256, and a private key derived from challenges stored in the lookup table for the user device associated with User A. The secure server computer then transmits the encrypted message to User A together with a public key that includes the addresses and instructions that were used by the server computer to derive the private key from the lookup table. Then, using the public key, User A can extract the private key (i.e., the APG's responses from the APG) from its own APG and decrypt the encrypted message. In reverse, a similar method can be used by User A to send encrypted messages to the secure server computer.

The public keys generated in the process can be changed dynamically after each authentication cycle in such a way that if a particular key is compromised the impact is contained to a single event. The APGs can be designed with low cost commodity memory arrays with large numbers of addressable PUFs and stringent error-correcting methods to generate a large number of private keys for cryptographic protocols with large entropy.

Two methods are typically used for implementing PKIs: RSA and ECC. Each user has a pair of keys: the public key which is not secret and the highly secret private key. With RSA one of these two keys can be indifferently used to encrypt a message while the second key is only capable of decrypting the message. With ECC the public key of the receiving party and the private key of the encrypting party are the same as the public key of the encrypting party and the private key of the receiving party; this allows the use of any symmetrical encryption algorithms to protect the communication between both parties.

The public key of RSA is calculated as the inverse of the private key of a finite field modulo, $\Phi(n)$, with n being the integer needed to encrypt/decrypt messages and $\Phi(n)$ as the Euler function of n, calculated as the number of co-prime of n. If $n = p \times q$ with both p and q being prime, $\Phi(n) = (p-1)(q-1)$. If p and q are large enough, the knowledge of n is not enough to be able to find $\Phi(n)$ with existing computers, keeping the private key non-discoverable.

For ECC, a cyclic group is constructed based on elliptic curve equations, and a bi-dimensional reference point $T=(X_T, Y_T)$ that is part of the cyclic group. The private key is a very large integer number a; the public key is designated as $X_A$ and calculated by the algorithmic multiplication of a and the reference point T, which is also part of the cyclic group: $A=(X_A, Y_A)$. When the cyclic group is large enough, the full knowledge of the public key $X_A$, T, and the cyclic group is such that the private key a is non-discoverable with existing computers.

A loss to a malicious user of the public keys is irrelevant because this is "public" information, however a loss of the private keys represents the termination of the trust in the PKI. Currently, side channel attacks are often effective at extracting private keys from connected devices elements, and secure processor based devices. Longer term the threat around PKI may be even more formidable.

Unlike asymmetrical cryptographic algorithms, symmetrical algorithms use the same key to encrypt and decrypt messages. When combined with key exchange protocols such as the Elliptic Curve Diffie-Hellman Key Exchange (ECDHKE), symmetrical algorithms are also excellent candidates for PKI implementation. The most important symmetrical algorithm, AES-256, can be strengthened with protocols with additional levels of randomness which can be resistant to quantum computing attacks.

Hash functions are important one-way cryptographic methods able to convert messages of various lengths into fixed-length data streams. Certain hash functions such as SHA-256 have low rates of collision, meaning that two different messages have an insignificant probability of having the same hash digest. Another important property is to be image-resistant, changing only one bit of a message should produce a hash digest that is entirely different than the original one.

Arrays of addressable PUF generators (APGs) are functional units that include a relatively large number of PUFs. Within an APG, the PUFs are arranged in an addressable array (e.g., a two-dimensional array), in which each PUF has a specific and known address within the array. During operation, the PUFs exploit manufacturing variations which are introduced during device fabrication, such as local variations in doping levels of semiconducting layers which make all PUF devices identifiable from each other. In response to an input signal (e.g., an input voltage), each PUF generates an output signal (e.g., an output voltage) that can be used to create output values usable as security keys, for example. Due to their individual manufacturing variations, the output of a particular PUF is difficult to predict and, therefore, difficult to duplicate, meaning that an individual PUF cannot be simply cloned, making them useful as physical security tokens.

The underlying mechanism of each of the addressable PUFs is the creation of a large number of Challenge (i.e., Input) Response (i.e., output) Pairs (called CRPs). Once deployed during the authentication cycles, a particular PUF located at a particular address of the array is queried with the same method; the authentication is positive when the rate of matching CRPs is sufficiently high.

Figure 1:
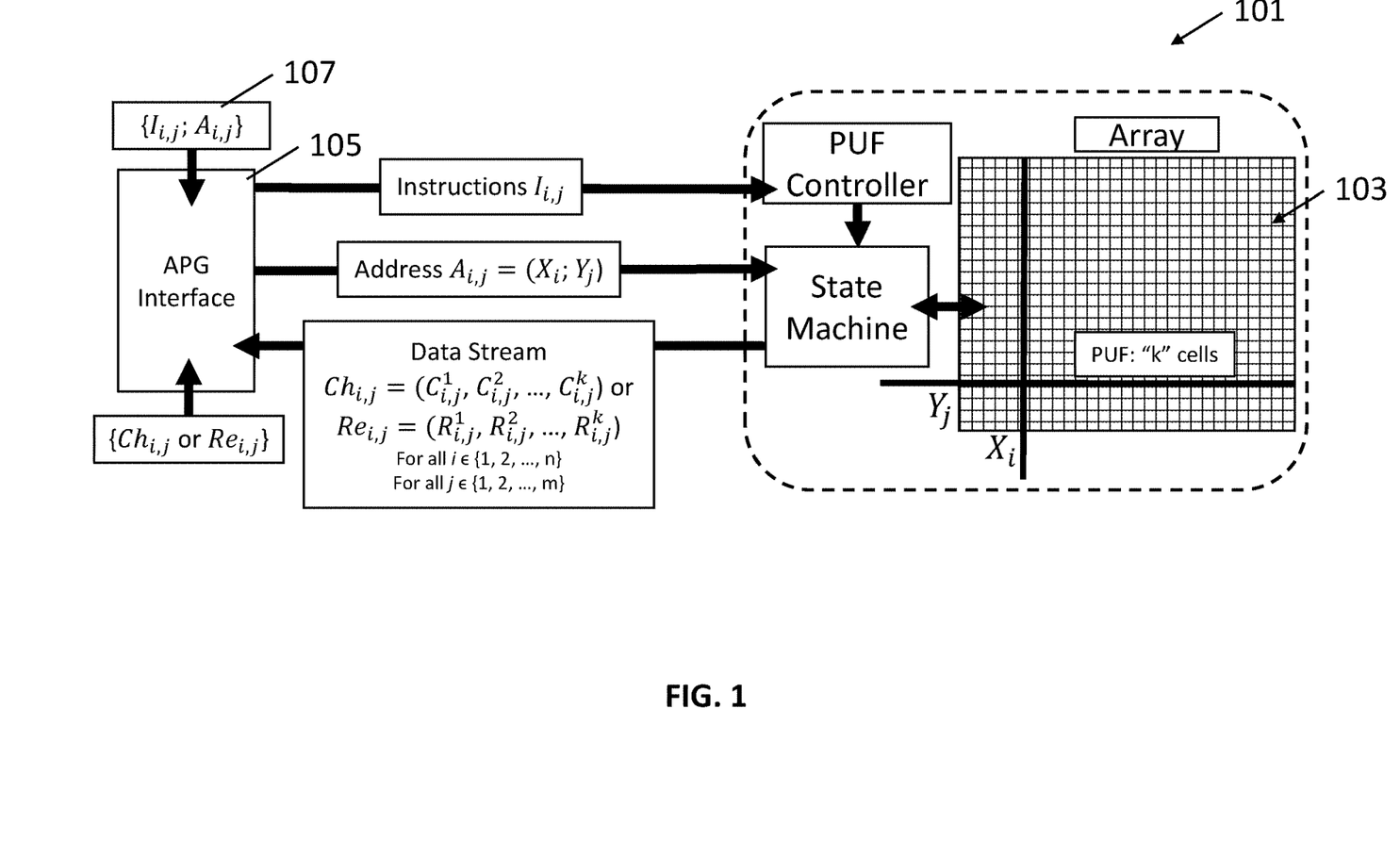
FIG. 1 is a block diagram depicting an Addressable PUF Generator (APG) architecture.

Memory arrays can be elements to generate large number of addressable PUFs within one device. Usually, individual PUFs are designed with only a small number of cells k (e.g., 128 to 256 cell range), while the size of the memory arrays commercially available needed to design APGs have densities in the megabyte range. FIG. 1 depicts an example block diagram of an Addressable PUF Generator (APG) architecture. As shown, k successive cells following the address "$A_{i,j}$" can become the PUF address "i,j". As illustrated, APG 101 includes an array of PUFs (represented by array 103). APG 101 includes an interface 105 configured to process challenges (Ch) and/or responses (Re) according to received sets of instructions 107. One of the methods to generate CRPs at the PUF address "$A_{i,j}$" is to characterize a particular parameter P (e.g., an output voltage of the cell given a particular input voltage) of the k-cells with a "built-in-self-test" (BIST) module. Each cell of each PUF being different, the value of parameter P varies cell to cell, and follows a distribution with a median value T. For challenge and response generations, all cells with P below T can be allocated a value "0", and all others a value "1".

The pair address/instruction $\{A_{i,j}; I_{i,j}\}$ 107 identifies the PUF "i,j", which may include a number of different cells, within array 103, with the instructions to measure the stream of challenges $Ch_{i,j}=\{C_{i,j}^k, \ldots, C_{i,j}^k\}$, and the stream of responses $Re_{i,j}=\{R_{i,j}^1, \ldots, R_{i,j}^k\}$. In order to reduce the CRP error rate, some approaches include the use of ternary states, $C_{i,j}^f$ and $R_{i,j}^f \in \{0, 1, X\}$ with $f \in \{1, \ldots, k\}$. The "X" cells within the k-cells are unstable or were measured close to (e.g., within a threshold value or percentage of) the median value T, while the "0" or "1" states are predictable, yielding low CRP error rates. The instructions 107 can include indications of the position of the cells that need to be blanked "X"—that is, assigned the ternary value X—as well as the additional cells that may be blanked to confuse a potential attacker. One example of instruction $I_{i,j}$ is a data stream of k bits: when there is a "0" at position f, the challenge and response $C_{i,j}^f$ and $R_{i,j}^f$ are blanked; when there is a "1", these cells are unchanged. For example, if k=512, then $I_{i,j}$ can be a data stream of 512 bits, leaving 256 bits of the CRPs non-blanked and active for authentication. A malicious user having access to an APG may not be able to extract the challenges and responses $Ch_{i,j}$ and $Re_{i,j}$ without knowing the instruction $I_{i,j}$. The addresses can be also protected by a hash function and random numbers. In some embodiments, the instructions, in additions to describing the length of the stream of data to be read from the PUFs in array 103, will also describe an angle along which the stream should be read. Referring to array 103, for example, the instructions may specify an angle of 0, 45, 90, 135, 180, 225, 270, and 315 along which, cells in array 103 should be read to generate the appropriate data stream.

The public keys of the present encryption scheme can be a set of instructions that can be shared in non-secure environments. The private keys, hidden from third parties, can encrypt messages with symmetrical algorithms such as AES. These private keys may need to be exchanged in a secure environment before communication can take place. The schemes provided below are to be considered as embodiments.

In a first scheme, during an initial personalization step, the challenges of the multiple PUFs of a user device's APG are generated in a systematic way to generate a lookup table describing the outputs of the PUFs in the user device's APG. That table, once generated can then be stored in a server computer's memory, to later, as described herein, enable secure communications with that server computer.

Figure 2:
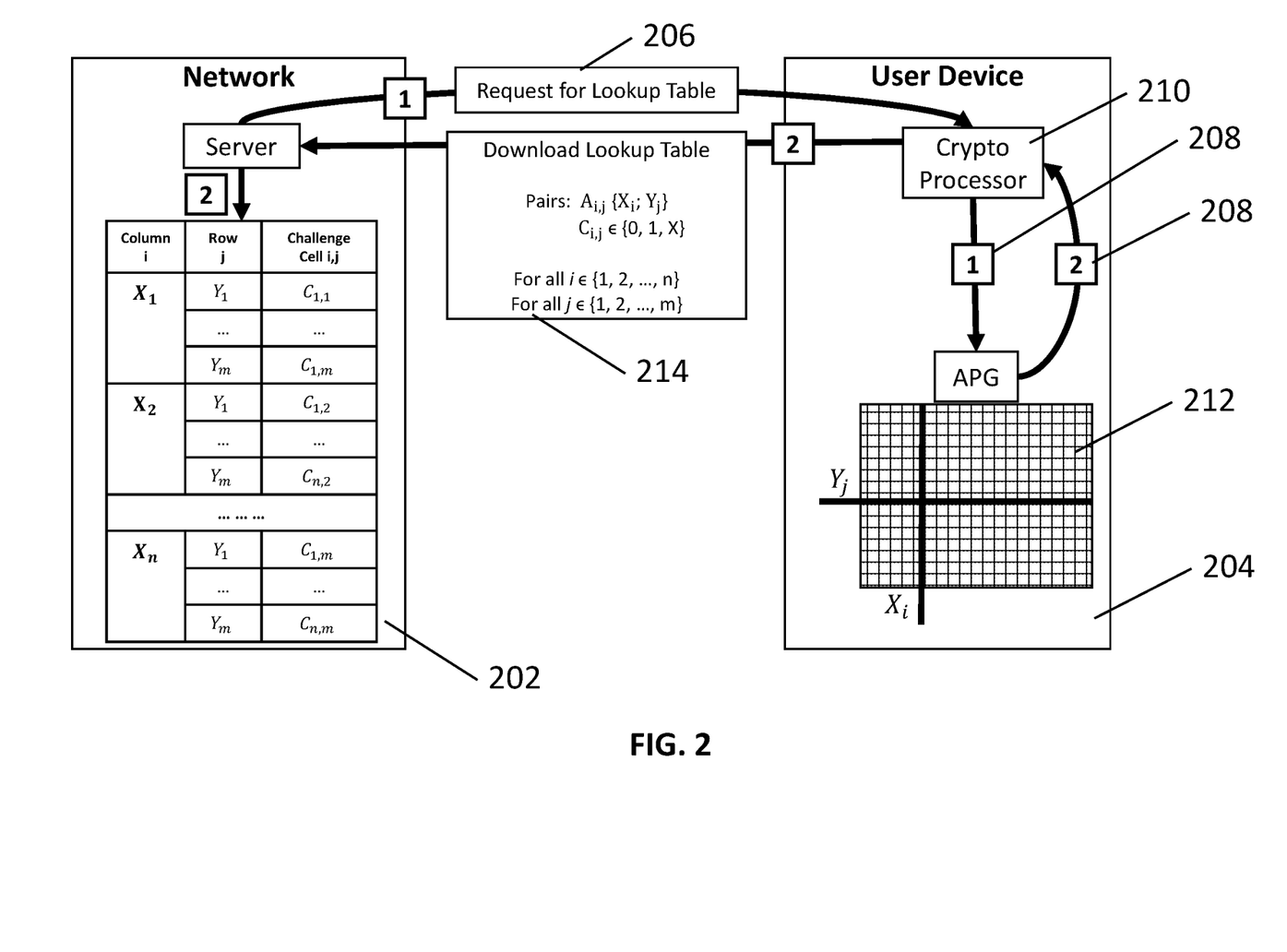
FIG. 2 depicts a process of downloading of a lookup table from an APG to a Server's memory.

To illustrate, FIG. 2 depicts server computer 202 and user device 204. In a first step 206, server computer 202 transmits a request to user device 204 for that user device's lookup table (though in other embodiments, user device 204 may instead initiate the transfer of the lookup table to server 202). In step 208, crypto processor 210 of user device 204 sequentially interrogates a sequence of PUFs making up APG 212 to generate a set of challenges values. As part of that interrogation, crypto processor 210 constructs a lookup table that specifies, for each PUF in APG 212 (or a number of PUFs in APG 212), the PUFs challenge value, in combination with the address of the PUF generating that challenge value. Once constructed, as depicted, that table 214 is transmitted to server computer 202 for storing.

For each address $A_{i,j}$: $\{X_i, Y_j\}$ in table 214, the challenges may be described by ternary states $C_{i,j} \in \{0, 1, X\}$, as described above. The "0" state can be stored as (01), the "1" state stored as (10), and the ternary "X" states stored as (11) or (00). For example, if n=256 and m=256, there will be 65,536 cells with corresponding ternary values in the table.

With the user device's lookup table stored on the server computer, both the server computer and the user device have secret information (i.e., the lookup table stored in the server computer and the APG itself in the user device) enabling the devices to implement a public key encryption scheme, as described herein.

Figure 3:
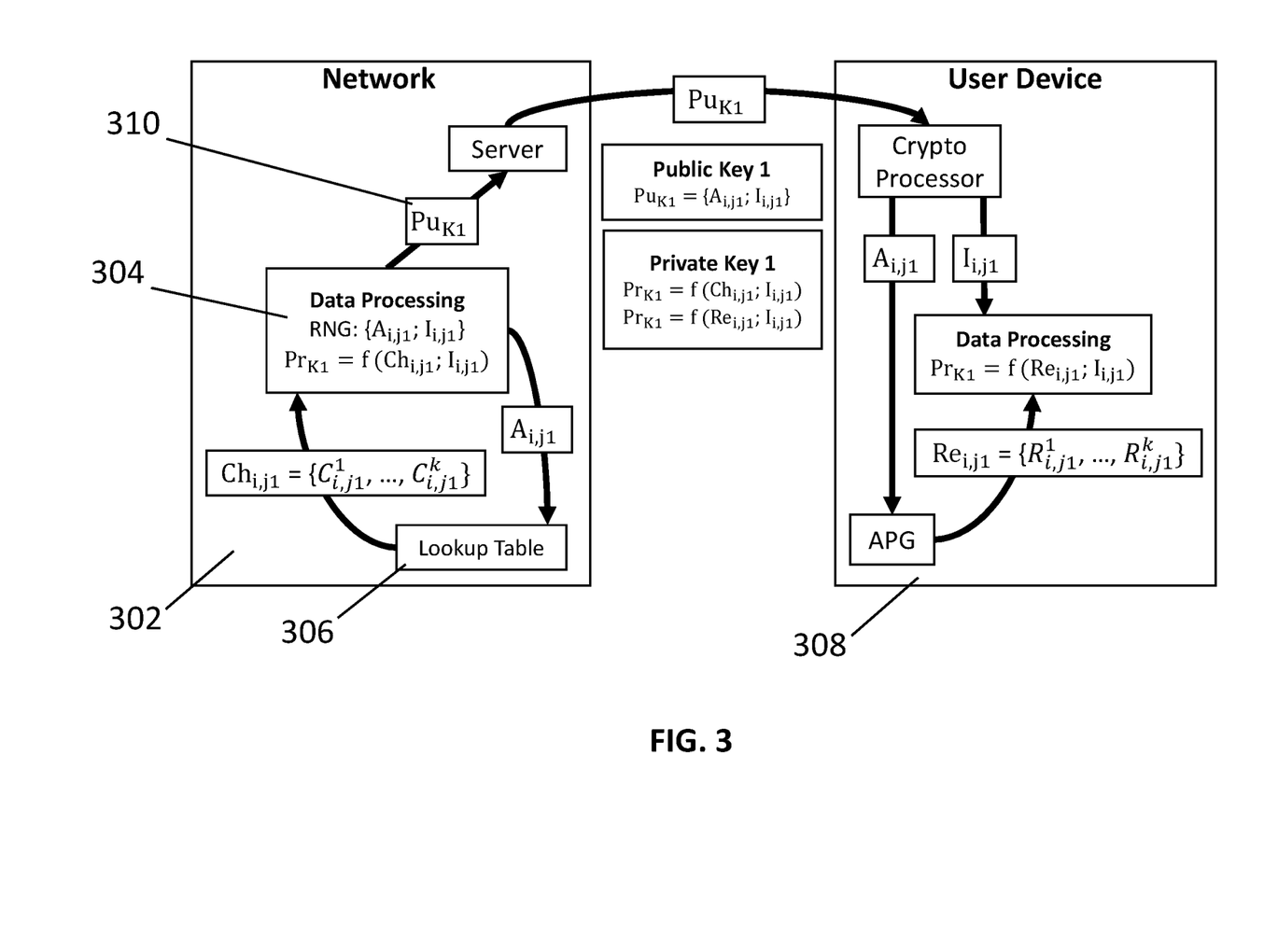
FIG. 3 depicts the exchange of public keys between devices.

FIG. 3 depicts a public key exchange process that may be initiated by a data processing element of the server computer. As illustrated, server computer 302, using data processing block 304, generates an initial address value (e.g., using a random number generator). With an address identified, server computer 302 accesses the lookup table 306 for a particular user device 308 to retrieve challenge values from lookup table 306 at and around that particular address. Those challenge values, once retrieved are then used to construct a private key $Pr_{K1}$.

The k cells located at and after address $A_{i,j1}$ can generate a first stream of PUF challenges $Ch_{i,j1} = \{C_{i,j1}^1, \ldots, C_{i,j1}^k\}$ generated by the APGs. The lookup table 306 can be considered cyclic if $A_{i,j1}$ is located toward the end of the table, and the count of the k cells can continue at the top of the table. One of the first instruction sets, $I_{i,j1}$, can be comprise a binary data stream $I_{i,j1} = \{I_{i,j1}^1, \ldots, I_{i,j1}^k\}$ with the following description: If $C_{i,j1}^f = X$, then $I_{i,j}^f = 0$ and a random number generator produces additional 0's in the $I_{i,j1}$ data stream; in such case, all remaining positions in the $I_{i,j1}$ data stream are 1's.

For example if k=1000 in the 256×256 table, a particular data stream of challenges located at $A_{i,j}$ can have 300 cells blanked with "X" and additional 200 cells blanked by the random number. The resulting $I_{i,j1}$ will have 500 0 states and 500 1 states.

The first private key $Pr_{K1} = f(Ch_{i,j1}, I_{i,j1})$ is a stream of p binary bits $\{Pr_{K1}^1, \ldots, Pr_{K1}^p\}$ which is generated the following way: If $I_{i,j1}^k$ is a 0, then the corresponding challenge $C_{i,j1}^k$ is eliminated from the data stream of ternary states; if n-p bits of Iii are 0's, then p bits will be left in the data stream of challenges which are binary because all ternary bits were removed. The resulting data stream is the private key: $Pr_{K1} = \{Pr_{K1}^1, \ldots, Pr_{K1}^p\}$.

With the private key determined, server computer 302 generates a public key $\{A_{i,j1}, I_{i,j1}\}$ 310 that can be openly shared by server computer 302 to user device 308. User device 308 receives the public key 310 and extracts from that key the address A and instruction I values. The knowledge of both the address $A_{i,j1}$ and the instruction $I_{i,j1}$ retrieved from public key 310 allows the user device 308 to generate a stream of responses $Re_{i,j} = \{R_{i,j}^1, \ldots, R_{i,j}^k\}$ and a duplicate private key $Pr_{K1} = f(Re_{i,j1}, I_{i,j1})$ with the assumption that $Re_{i,j1} = Ch_{i,j1}$. It is assumed here that by blanking enough cells with X states, the remaining un-blanked cells are extremely predictable with all CRP error rates at zero. Additional error correcting methods can be used to further enhance the reliability of the method.

In the example described above, the private key is a data stream of 500 bits comprising 300 bits are blanked "X" due to their marginal quality and an additional 200 bits are blanked to hide the key. In case of poor memory quality, the number of blanked X cells can be increased to a much higher ratio or a different address in the lookup table can be chosen.

At this point, both parties have knowledge of the same private key to communicate through the novel encryption scheme. It is assumed that a third party can intercept the public key (i.e., the instructions); however without possession of either the lookup table or the user device's APG, it is not possible to reconstruct the private keys. The method allows the use of private keys without actually transmitting sensitive information to a third party. The PUFs themselves are generally not readable through side-channel attacks, and the information contained inside the PUF can be secure and only available when needed.

Figure 4:
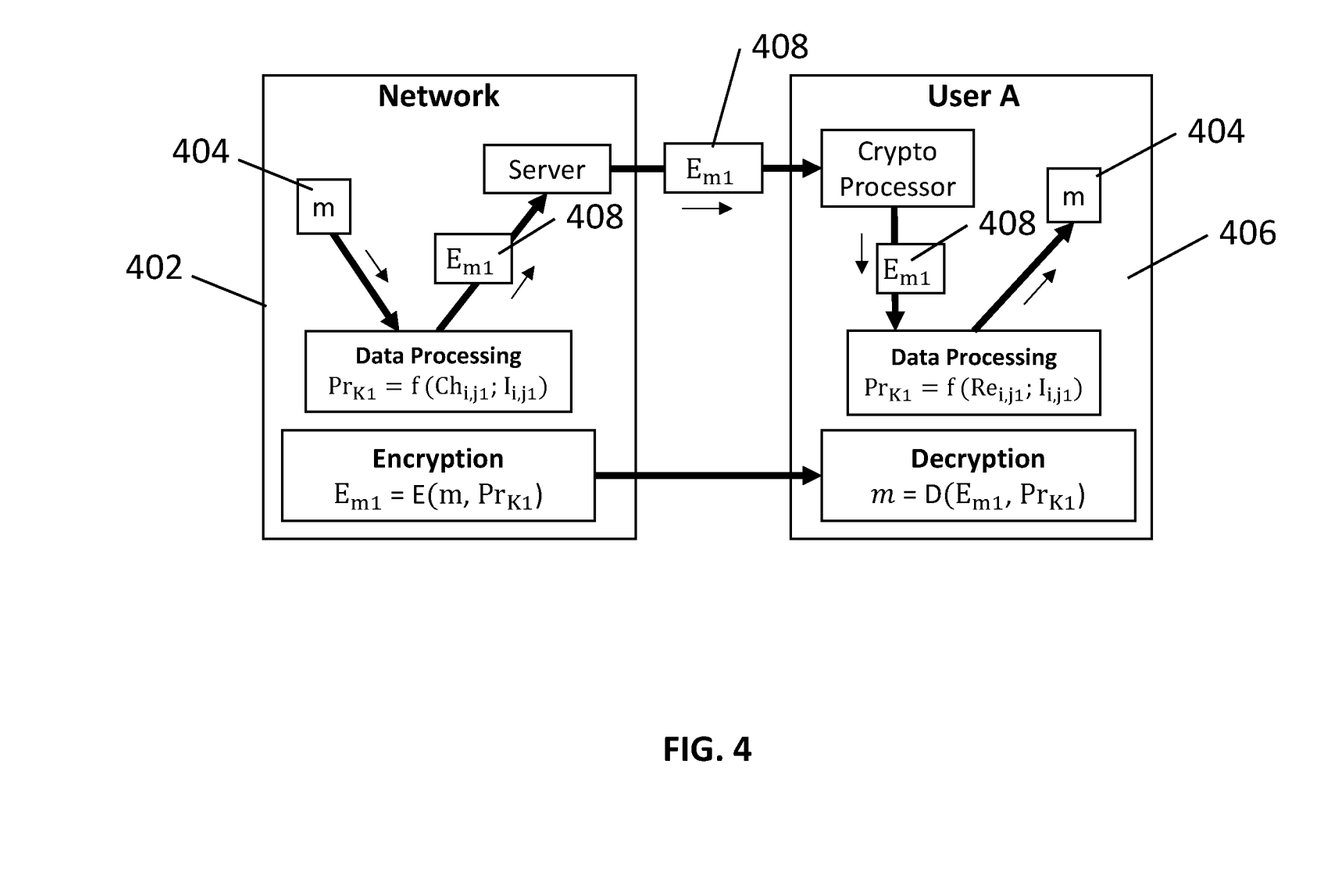
FIG. 4 depicts the encryption of a message m by a server computer for transmission to a user device.
Figure 5:
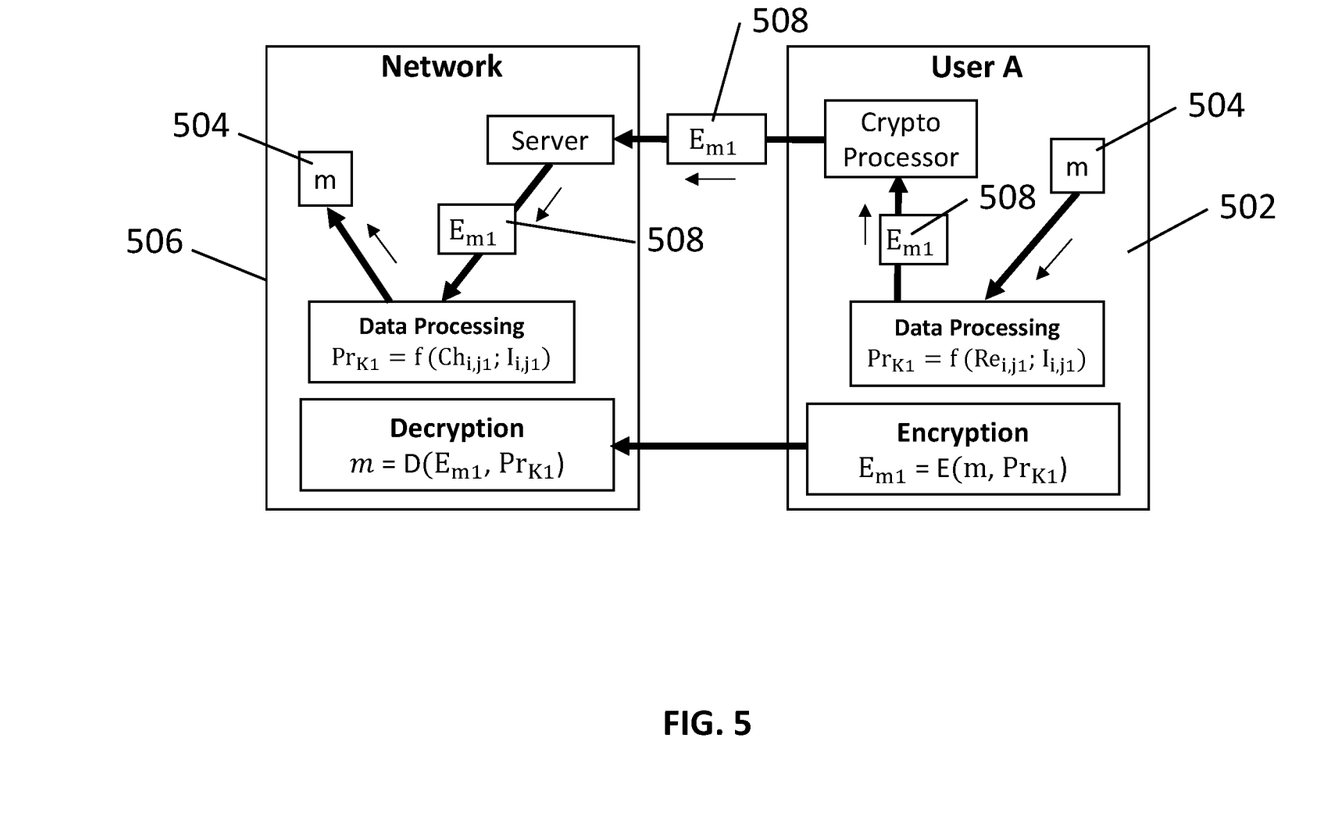
FIG. 5 depicts the encryption of message m by a user device for transmission to a server computer.

As shown FIG. 4 and FIG. 5, the private keys described above can allow secure two-way symmetrical encryption between the Server and the User. FIG. 4 depicts a data flow of a server computer transmitting an encrypted message to a user device using the present key exchange scheme, whereas FIG. 5 depicts the data flow for a user device transmitting an encrypted message to a server computer.

In FIG. 4, server computer 402 generates a message 404 to be encrypted and transmitted to user device 406. Using techniques described herein, server computer 402 accesses a lookup table for user device 406 to generate private key $Pr_{K1}$ (note that the public key—namely the instructions describing at least the address used when generating the private key have already been exchanged with user device 406 which, in turn, used the instructions to generate a duplicate of the private key). The private key is used to encrypt message 404 into an encrypted message $E_{m1}$ 408, which is transmitted to user device 406. User device 406 then uses its own private key (independently generated from the private key of server computer 402 to decrypt the encrypted message $E_{m1}$ 408 into the unencrypted message m that was originally generated by server computer 402.

Conversely, FIG. 5 shows a data flow for a user device transmitting an encrypted message to a server computer. User device 502 generates a message 504 to be encrypted and transmitted to server computer 506. Using techniques described herein, user device 502 generates a private key $Pr_{K1}$, for example, by accessing an APG (note that the public key—namely the instructions describing at least the address used when generating the private key have already been exchanged with server computer 506 via the transmission of the lookup table for user device 502 which, in turn, used the instructions to generate a duplicate of the private key). The private key is used to encrypt message 504 into an encrypted message $E_{m1}$ 508, which is transmitted to server computer 506. Server computer 506 then uses its own private key (independently generated by accessing the lookup table previously-provided by user device 502) to decrypt the encrypted message $E_{m1}$ 508 into the unencrypted message m 204 that was originally generated by user device 502.

Considering that symmetrical encryption algorithms with long keys can be secure, key exchange protocols can be the weakest point of the schemes. The key exchange protocol described above may be only driven by the secure server computer, not the user device User A. A new public key can be generated by the server computer after each cycle of encryption-decryption, further strengthening the trustworthiness of the protocol. It is also possible to establish, both on the server side and the client side, a tracking of all previously-used public keys such that they will not be used a second time by a third party.

The number of possible public keys of such a protocol can be extremely high. For example, if k=1000, if the number of "X" cells is 300, the number of possible ways to blank an additional 200 cells with the instructions described above is $$\binom{200}{700} = 2 \times 10^{180}.$$

In this protocol, a malicious user with access to the public key can gain access to potentially useful information, such as the address within the APG and the instruction set to extract the responses. But, this information is not enough to expose the private keys; however, multi-factor authentication can be added to the encryption schemes to enhance security.

Figure 6:
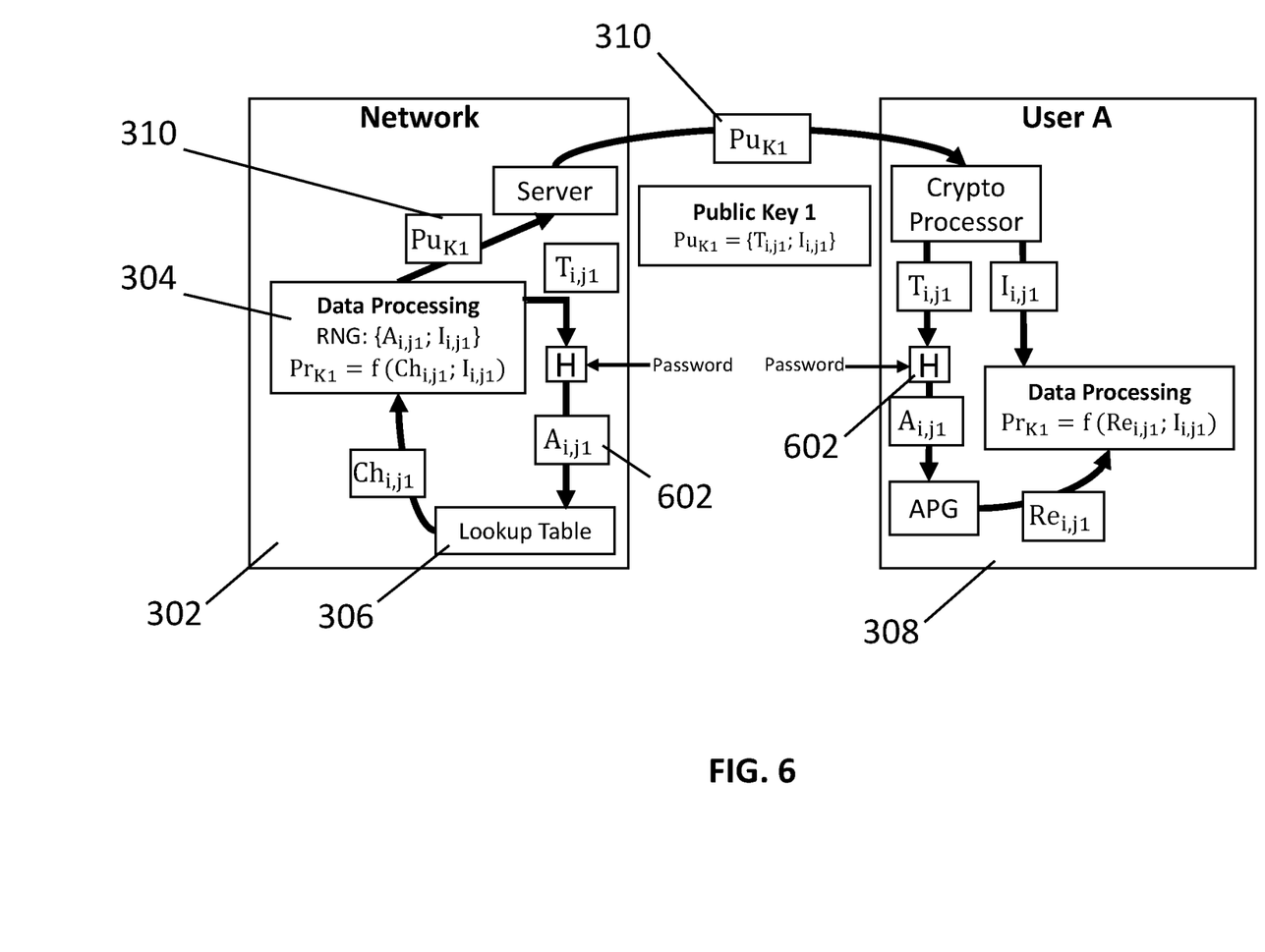
FIG. 6 depicts an approach for incorporation of password protection during key exchange.

The key generation and exchange process described above (see FIG. 3) can be modified to incorporate password protection schemes and hash functions. The revised protocol is shown in FIG. 6. Password 602 can be a data stream of any length and any origin such as a pin code or a biometric print (e.g., fingerprint, hand, face, voice, vein, retina/iris, signature) may be utilized. Password 602 may be known by both parties and exchanged prior to the implementation of the protocol depicted in FIG. 6. A random number $T_{i,j1}$ is generated on by server computer 302. The random number can then be combined with the random number using any suitable approach (e.g., hashing) to generate the address $A_{i,j1}$ from the random number and the password. For example, if the APG is a 256×256 array, the first 8 digits of the hash message can be the address of the column $X_i$ and the next 8 digits can be the address of row $Y_j$. The private key, $Pr_{K1}$=f $(Ch_{i,j1}, I_{i,j1})$, is then generated using a similar method and depicted in FIG. 3.

The public key 310 transmitted is $Pu_{K1}=\{T_{i,j1}; I_{i,j1}\}$. User device 308 can then generate the address $A_{i,j1}$ using the same password and $T_{i,j1}$ and then the private key $Pr_{K1}$=f $(R_{i,j1}, I_{i,j1})$ with the same method from the APG. With this password protection method, a malicious user may not be able to uncover the address of the PUF used in the encryption scheme. For example, if a malicious party takes possession of the user's terminal device, the knowledge of the public key alone will be useless unless the malicious party also takes possession of the password. A third level of protection through multi-factor authentication can be added if the terminal device has biometric methods to authenticate the user.

The methods described above may assume that high quality APGs are available on the terminal or user devices which may not be the case with legacy systems. Therefore, the following approaches may be based on memory arrays that are back-compatible with legacy systems. However, the resulting level of protection can be lower because it may be easier for malicious parties to read the content of memory arrays than generated PUF responses. As done with smart cards and secure elements, technologies to protect the content of memory arrays are known and can be re-used.

Figure 7:
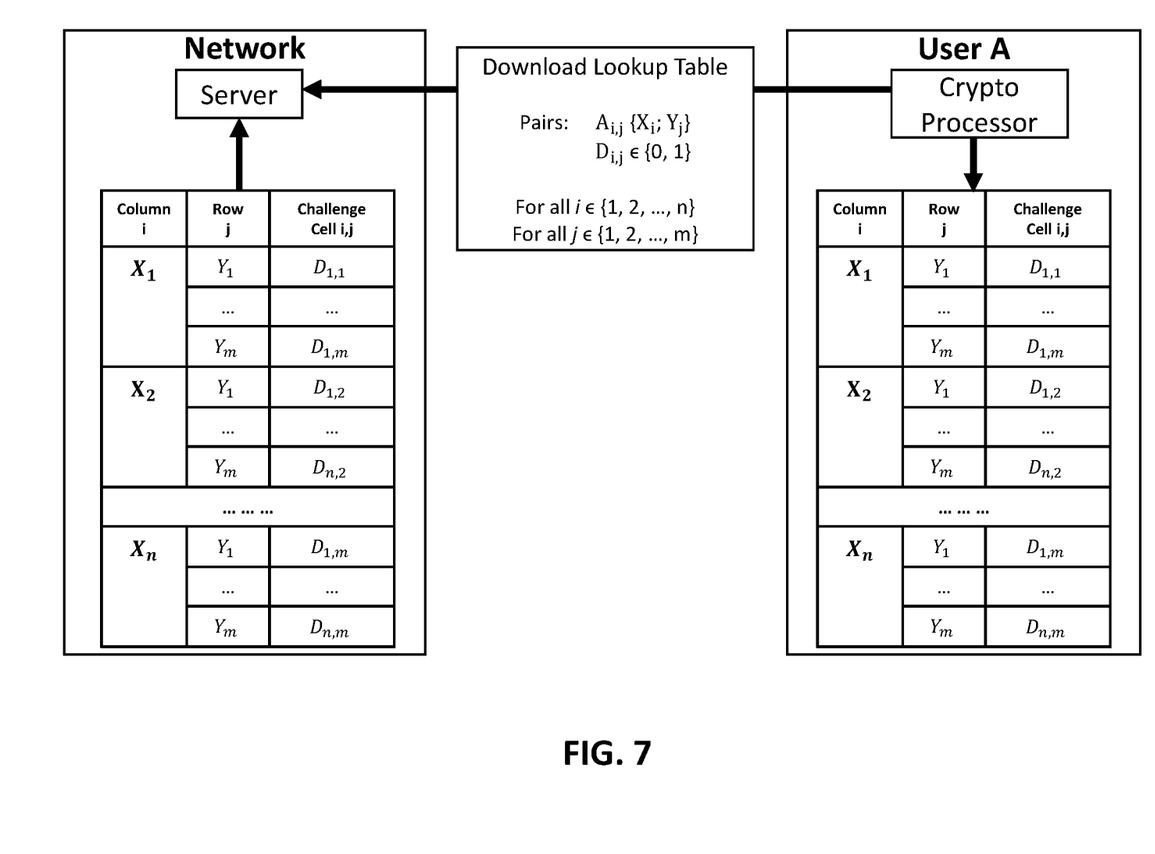
FIG. 7 depicts a process of downloading a lookup table from a server computer to a user device's memory.
Figure 8:
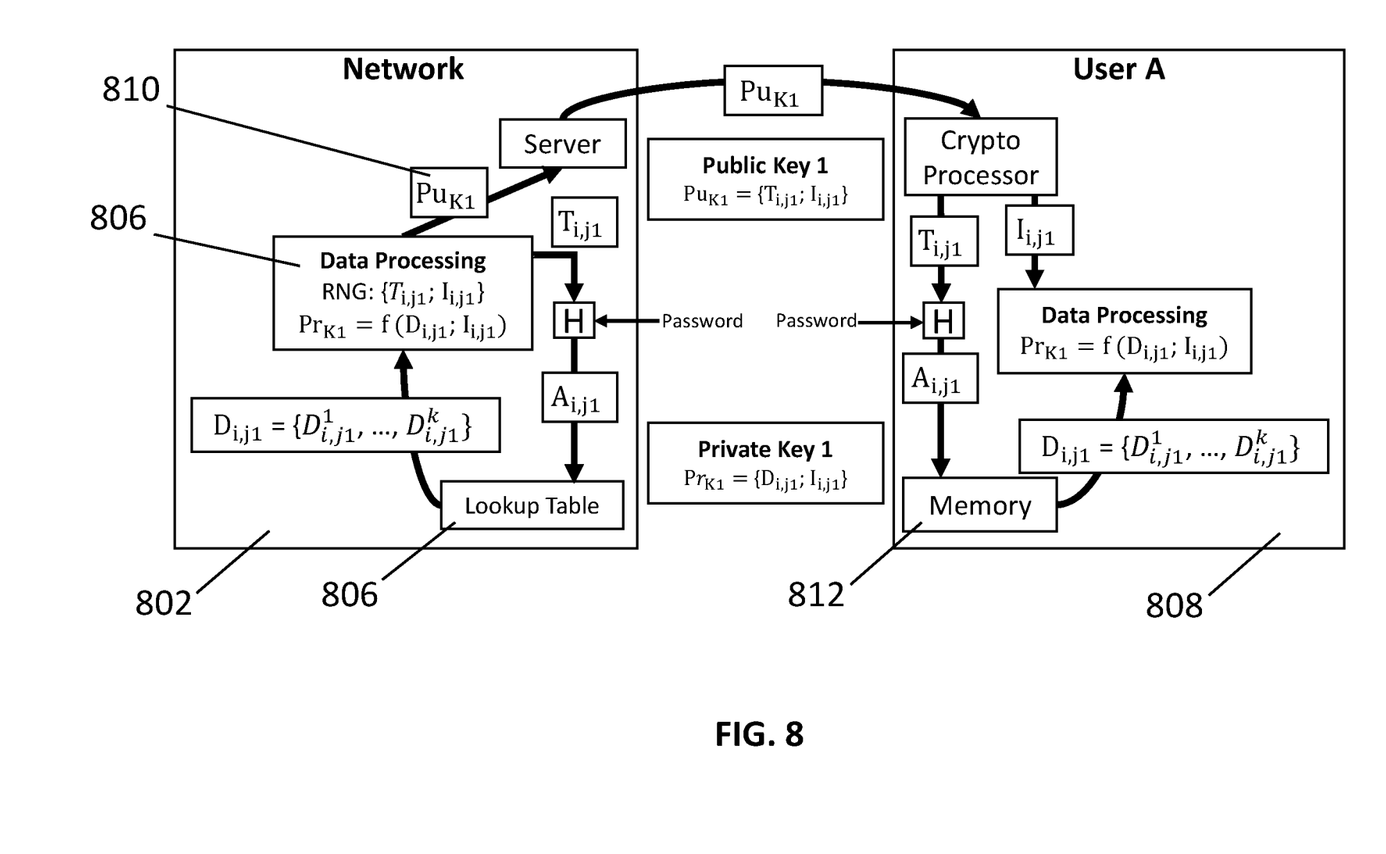
FIG. 8 depicts an alternative approach for key exchange with password protection.

As shown in FIG. 7, an entire lookup table may be downloaded to the secure memory by the server computer during the personalization step. The server computer sends the user device User A the list of binary data $D_{i,j}$ located at the addresses $A_{i,j}$. The key exchange, as shown in FIG. 8, is similar to the embodiment described above, however the data streams $D_{i,j}$ are replaced by data streams $C_{i,j}$ or $R_{i,j}$.

Specifically, as illustrated, server computer 802, using data processing block 804, generates an initial address value (e.g., using a random number generator). With an address identified, server computer 802 accesses the lookup table 806 for a particular user device 808 to retrieve a data stream from lookup table 806 at and around that particular address. That data stream, once retrieved is then used to construct a private key $Pr_{K1}$.

With the private key determined, server computer 802 generates a public key $\{T_{i,j1}, I_{i,j1}\}$ 810 that can be openly shared by server computer 802 to user device 808. User device 808 receives the public key 810 and extracts from that key the address A and instruction I values. The knowledge of both the address $A_{i,j1}$ and the instruction $I_{i,j1}$ retrieved from public key 810 allows the user device 808 to access its own memory 812 to generate a duplicate private key $Pr_{K1}$.

Communication methods based on memory arrays in the place of APGs may not have to face the complexity of potential CRP error rates which can be a positive point. The encryption schemes based on symmetrical algorithms are also similar to those described above.

The encryption schemes described herein can be used for authentication after the personalization steps are executed. One reliable way to authenticate a user is to ask the user to respond to the Server's public key exchange with an encrypted message by the private key. An unauthorized user may not have an addressable element to generate the private key. This could be very useful to authenticate the Internet of Things (IoT), users of banking cards, smart passports, SIM cards, transport title, smart phones, and any connected devices.

In some embodiments, a network can be authenticated by the users by sending both a public key and an encrypted message with the private key. The user will then generate its private key and decrypt the message. The integrity of the message is a guarantee that the network has access to a valid lookup table. This could be very valuable to block malicious networks trying to drive connected devices such as drones, Unmanned Aerial Vehicles (UAVs), Electric Vehicles, airplanes, Smart grid, financial terminals, or any sensitive peripheral elements.

Unlike traditional PKI, the present method may not easily provide direct peer to peer secure communication unless the peers can exchange lookup tables. However, the peer to peer communication may be accomplished through and under the control of the network. This is advantageous for institutions interested in preventing uncontrolled peer to peer transactions, such as wireless communication suppliers, financial institutions, and strategic deployments.

In various embodiments, encryption schemes between a network and client device which contain arrays of addressable PUF generators that are based on the generation and exchange of public keys and private keys may be operated in the following way. During a personalization step, lookup tables containing the challenges of the arrays of PUFs within the addressable PUF generators are downloaded to the memory of the network. These lookup tables are organized by PUF address and corresponding challenges. In order to the generate a particular private key in the network side, the stream of PUF challenges stored in a particular address within the lookup table is extracted. Following a particular set of instructions, these challenges are used to generate a first binary data stream, the private key. The particular address and the particular set of instructions are described by a second binary data stream, the public key. The second data stream, the public key, is shared with the client device. With the public key, the client device can find the address of the same PUF used by the network and find the same set of instruction generating the responses, thereby the same private key. The network and the client device encrypt and decrypt messages by using symmetrical cryptography and the shared private key.

In other embodiments, encryption schemes between a network and client device with addressable memory elements that are based on the generation and exchange of public keys and private keys may operate as follows. During a personalization step, lookup tables are downloaded to the memory. These lookup tables are organized by address within the memory array and corresponding stored data. In order to generate a particular private key in the network side, the stream of data that is stored in a particular address within the lookup table is extracted. Following a particular set of instructions, this stream of data is used to generate a first binary data stream, the private key. The particular address and the particular set of instructions are described by a second binary data stream, the public key. The public key is shared with the client device. Using the public key, the client device finds the same address in the memory used by the network and the same set of instructions generating the same data steam (same private key). The network and the client device encrypt and decrypt messages by using symmetrical cryptography and the shared private key.

In some cases, the arrays of physically unclonable functions that are part of the client device are designed with, but not to be limited to, static random-access memories (SRAMs), dynamic random-access memories (DRAMs), Resistive RAM (ReRAM) memories, magnetic memories, Flash memories, electrically erasable programmable readonly memories (EEPROMs), one-time programmable (OTP) memories, arrays of ring oscillator PUFs, gate delays oscillators, optical PUFs, sensors, and microelectromechanical systems MEMS PUFs.

The physically unclonable functions may have binary state, ternary state, quaternary state, or other multi-states. The additional states of the PUFs may have the purpose to reduce the challenge-response-pair error rate or to increase the entropy. The instruction set may be a binary data stream produced with random numbers blanking or eliminating part of the challenges, responses, or data streams. The purpose of this additional blanking can be to increase entropy. The random numbers may be true random numbers or pseudo random numbers. The encryption methods may be AES, DES, triple DES, Blowfish, or any symmetrical algorithms.

In various embodiments, the client devices may be smart cards, SIM cards, banking cards, secure microcontrollers, Internet of Things, connected devices, ID cards, smart passports, transport titles, computers, workstations, telephones, smart phones, tablets, servers, base stations, drones, UAVs, Electric Vehicles, airplanes, satellites, or any other element connected to a physical cyber system.

The addresses of addressable PUFs, and the addresses of memory arrays can be parameters such as, not to be limited to the coordinates (X, Y) in the array, the cells following a particular angle within the array, multiple locations spread across the array, and combinations of these elements.

In some embodiments, the encryption methods are combined with additional cryptographic protocols to secure the communication within the network, and transfer securely the information between the network and the client device. These additional protocols include, but are not limited to, public key infrastructure (PKI), use of private keys, use of symmetrical (e.g., DES, AES), and asymmetrical cryptography (e.g., RSA), secret key exchange methods (e.g., quantum cryptography, Elliptic Curve Cryptography), hash functions, and the use of biometric prints.

Peer to peer encryption may be provided with the network acting as a central commanding element. The encryption schemes may involve generating two sets of private-public keys: the first set has the purpose to support subsequent authentication of the network while the second set has the purpose to encrypt messages. New sets of private-public keys can be generated after each encryption-decryption cycle to strengthen security. The encryption schemes can also have an additional APG that is part of the network to download a lookup table in the client device, and allows the client device to act in a symmetrical way, and generate private-public keys with the methods described above. The encryption schemes may also use an additional memory array that is part of the client device to download a lookup table in the network, and allows the client device to act in a symmetrical way and generate private-public keys. The encryption methods described above may be modified to incorporate hash functions in both the network side and the user device. The hash functions can be one-way cryptographic function converting a shared password and a particular random number into a particular address within the arrays of addressable PUF generator. The lookup tables described above can be organized by random numbers and challenges. The public keys are the combination of random numbers and instruction sets, and the resulting private keys and encryption schemes are unchanged. The encryption methods described above can be modified to incorporate hash functions in both the network side and the user device. The hash functions may be one-way cryptographic functions converting a shared password, and a particular random number into a particular address within the memory arrays. The lookup tables described above can be organized by random numbers and data streams; the public keys can be the combination of random numbers, and instruction sets; and the resulting private keys, and encryption schemes are unchanged. The hash functions can be hash functions such as SHA. The passwords can be an alpha numeric passcode, a pin code, a finger print, retina/iris print, or any other biometric authentication print.

In an embodiment, a system includes a user device including an array of physically unclonable functions, and a first processor configured to generate a data stream by accessing a physically unclonable function at a first location in the array of physically unclonable functions, encrypt a message using the data stream to create an encrypted data stream, and encode a transmission including the encrypted data stream and the first location. The system includes a server computer including a memory storing a look-up table including a plurality of data values, each data value being associated with a location value, and a second processor configured to receive the transmission from the user device, retrieve a data value from the look-up table, wherein the location value associated with the data value is equal to the first location, and decode the encrypted data stream using the data value.

In another embodiment, a device includes an array of physically unclonable functions and a processor configured to generate a data stream by accessing a physically unclonable function at a first coordinate in the array of physically unclonable functions, encrypt a message using the data stream to create an encrypted data stream, transmit, via a communication network, the encrypted data stream and an identification of the first coordinate to a remote computer system.

In another embodiment, a method includes generating a plurality of physically unclonable function challenge values by accessing a plurality of physically unclonable functions in an array of physically unclonable functions, generating a first binary data stream using the plurality of physically unclonable function challenge values, and encrypting a message using the first binary data stream to generate an encrypted binary data stream. The method includes generating a second binary data stream. The second binary data stream identifies an address within an array of physically unclonable functions from which the first binary stream was generated. The method includes transmitting the encrypted binary data stream and the second binary data stream to a remote computing device.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method, comprising:
generating a plurality of physically unclonable function challenge values by accessing a plurality of physically unclonable functions in an array of physically unclonable functions;
generating a first binary data stream using the plurality of physically unclonable function challenge values;
encrypting a message using the first binary data stream to generate an encrypted binary data stream;
generating a second binary data stream, the second binary data stream identifying an address within an array of physically unclonable functions from which the first binary stream was generated;
transmitting the encrypted binary data stream and the second binary data stream to a remote computing device, wherein generating the plurality of physically unclonable function challenge values includes accessing a sequence of physically unclonable functions in the array of physically unclonable functions along an angle in the array; and transmitting an indication of the angle to the remote computing device.

2. The method of claim 1, wherein the array of physically unclonable functions include at least one of static random access memory, dynamic random access memory, resistive random access memory, electrically erasable programmable read-only memory, one-time programmable memory, an array of ring oscillators, gate delays oscillators, optical physically unclonable functions, and microelectromechanical system physically unclonable functions.

3. The method of claim 1, further comprising determining the address within the array of physically unclonable functions at least partially by hashing a password.

4. A method, comprising:
generating a plurality of physically unclonable function challenge values by accessing a plurality of physically unclonable functions in an array of physically unclonable functions;
generating a first binary data stream using the plurality of physically unclonable function challenge values;
encrypting a message using the first binary data stream to generate an encrypted binary data stream;
generating a second binary data stream identifying addresses of the plurality of physically unclonable functions from which the first binary stream was generated, the second binary data stream identifying at least a first physical unclonable function and an angle in the array; and
transmitting the encrypted binary data stream and the second binary data stream to a remote computing device.

5. The method of claim 4, wherein the second binary stream key comprises instructions sufficient to identify a sequence of additional physical unclonable functions defined with respect to the first physical unclonable function.

6. The method of claim 5, wherein the sequence of additional physically unclonable functions defined with respect to the first physical unclonable function are arranged along the angle in the array.

7. The method of claim 4, wherein the array of physically unclonable functions include at least one of static random access memory, dynamic random access memory, resistive random access memory, electrically erasable programmable read-only memory, one-time programmable memory, an array of ring oscillators, gate delays oscillators, optical physically unclonable functions, and microelectromechanical system physically unclonable functions.

8. The method of claim 4, wherein the first binary data stream includes ternary data and the second binary data stream encodes locations of values in the first binary data stream having a third state in a set of ternary states.

9. The method of claim 8, further including encoding into the second binary data stream a hash of the locations of values in the first binary data stream having the third state in the set of ternary states.

10. A method, comprising:
identifying a sequence of addresses of devices in an array of physically unclonable functions on the basis of a random number and a password;
generating a plurality of physically unclonable function challenge values by accessing a plurality of the physically unclonable functions identified in the sequence;
generating a first binary data stream using the plurality of physically unclonable function challenge values;
encrypting a message using the first binary data stream to generate an encrypted binary data stream;
generating a second binary data stream usable to identify the sequence of addresses; and
transmitting the encrypted binary data stream and the second binary data stream to a remote computing device.

11. The method of claim 10, wherein the array of physically unclonable functions include at least one of static random access memory, dynamic random access memory, resistive random access memory, electrically erasable programmable read-only memory, one-time programmable memory, an array of ring oscillators, gate delays oscillators, optical physically unclonable functions, and microelectromechanical system physically unclonable functions.

12. The method of claim 10, wherein identifying a sequence of addresses of devices in an array of physically unclonable functions on the basis of a random number and a password the public key comprises identifying a first location in the array and a sequence of additional physical unclonable functions defined with respect to the first location.

13. The method of claim 12, wherein the sequence of additional physically unclonable functions defined with respect to the first location are arranged along an angle in the array, wherein a first physically unclonable function in the sequence of physically unclonable functions is at the first location.

14. The method of claim 13, wherein the second binary data stream includes instructions sufficient to identify the angle.

15. The method of claim 10, wherein the first binary data stream includes ternary data and the transmission encodes locations of values in the data stream having a third state in a set of ternary states.

16. The method of claim 15, further including encoding into the transmission a hash of the locations of values in the first binary data stream having the third state in the set of ternary states.

* * * * *